(12) United States Patent
Biggs

(10) Patent No.: US 8,517,447 B2
(45) Date of Patent: Aug. 27, 2013

(54) VEHICLE STORAGE COMPARTMENT ASSEMBLY

(75) Inventor: Christopher James Biggs, South Lyon, MI (US)

(73) Assignee: Nissan North America, Inc., Franklin, TN (US)

( * ) Notice: Subject to any disclaimer, the term of this patent is extended or adjusted under 35 U.S.C. 154(b) by 106 days.

(21) Appl. No.: 13/191,283

(22) Filed: Jul. 26, 2011

(65) Prior Publication Data
US 2013/0026778 A1 Jan. 31, 2013

(51) Int. Cl.
*B60R 7/04* (2006.01)
(52) U.S. Cl.
USPC .................. 296/37.8; 296/24.34; 296/37.14
(58) Field of Classification Search
USPC ............... 296/37.8, 37.1, 37.6, 37.12, 37.13, 296/24.34; 248/311.2; 49/386
See application file for complete search history.

(56) References Cited

U.S. PATENT DOCUMENTS

| | | | |
|---|---|---|---|
| 5,520,313 A | 5/1996 | Toshihide | |
| 5,620,122 A | 4/1997 | Tanaka | |
| 6,206,260 B1 * | 3/2001 | Covell et al. | 224/539 |
| 6,715,727 B2 | 4/2004 | Sambonmatsu | |
| 6,726,267 B2 | 4/2004 | Kim et al. | |
| 6,808,097 B2 * | 10/2004 | Kim et al. | 224/483 |
| 7,175,217 B1 * | 2/2007 | Lota | 296/24.34 |
| 7,226,029 B2 | 6/2007 | Hoshi | |
| 7,481,343 B2 | 1/2009 | Misumi | |
| 7,731,254 B2 | 6/2010 | Lota | |
| 7,806,451 B2 * | 10/2010 | Lota | 296/24.34 |
| 7,862,096 B2 | 1/2011 | Kim et al. | |
| 2005/0248169 A1 * | 11/2005 | Clark et al. | 296/24.34 |
| 2007/0182187 A1 * | 8/2007 | Lota | 296/37.8 |
| 2007/0230099 A1 * | 10/2007 | Turner et al. | 361/683 |
| 2009/0174207 A1 * | 7/2009 | Lota | 296/24.34 |
| 2009/0174208 A1 * | 7/2009 | Lota | 296/24.34 |

OTHER PUBLICATIONS

Cup holder photograph, the 2009 Mazda 6.

* cited by examiner

*Primary Examiner* — Glenn Dayoan
*Assistant Examiner* — Sunsurraye Westbrook
(74) *Attorney, Agent, or Firm* — Global IP Counselors, LLP

(57) ABSTRACT

A vehicle storage compartment assembly includes a housing and a rigid lid. The housing defines a storage compartment and a lid cavity separated by a partition wall. The lid moves between an open position and a closed position. At least a portion of the lid is positioned within the lid cavity and the storage compartment uncovered in the open position. The lid covers the storage compartment and at least a portion of the lid cavity in the closed position. The lid has an inner surface configured relative to the upper free edge of the partition wall such that a first blocking portion of the inner surface is disposed adjacent a upper free edge of the partition wall and aligns with or overlaps with the upper free edge blocking space above the upper free edge of the partition wall while the lid is in the closed position.

20 Claims, 12 Drawing Sheets

VEHICLE STORAGE COMPARTMENT ASSEMBLY

BACKGROUND

1. Field of the Invention

The present invention generally relates to a storage compartment assembly for a vehicle passenger compartment. More specifically, the present invention relates to a storage assembly with a lid cavity that receives a portion of the lid when the lid is in an open position.

2. Background Information

The passenger compartments of most vehicles include an instrument panel (also referred to as a dashboard) having a cantilevered section or overhanging section that extends rearward above a forward section of the vehicle's center console. Consequently, it is difficult to utilize space within the forward section of the center console as, for instance, a small storage compartment. Specifically, the overhanging section of the instrument panel may cause interference with movement of a lid covering a small storage compartment installed in the forward section of the center console.

One solution to this problem has been the design of storage compartment assemblies that include a lid cavity, where a portion of the lid moves into the lid cavity when the lid is moved into an open position. However, it is possible for items stored into the storage compartment to move into the lid cavity.

SUMMARY

One object of the present invention is to provide a storage compartment assembly that includes a storage compartment and a lid cavity with structure that prevents items within the storage compartment from moving into the lid cavity.

In view of the state of the known technology, one aspect of a vehicle storage compartment assembly includes a housing and a rigid lid. The housing defines a storage compartment and a lid cavity that are separated by a partition wall having an upper free edge. The rigid lid is pivotally mounted to the housing for movement between an open position and a closed position. At least a portion of the lid is positioned within the lid cavity and the storage compartment is uncovered while the lid is in the open position. The lid covers the storage compartment and at least a portion of the lid cavity while the lid is in the closed position. The lid has an inner surface that is configured relative to the upper free edge of the partition wall such that a first blocking portion of the inner surface is disposed adjacent the upper free edge of the partition wall to block a space above the upper free edge of the partition wall while the lid is in the closed position.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
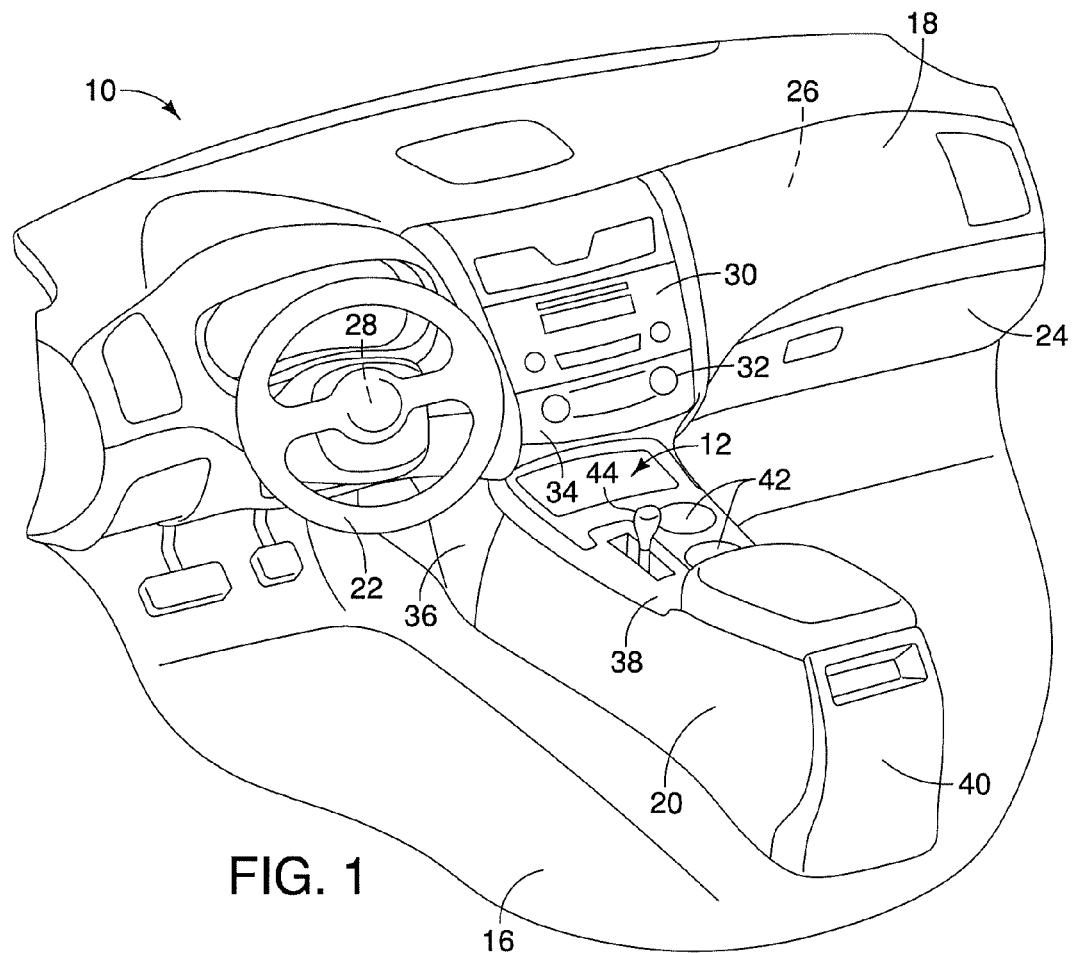
FIG. 1 is a perspective view of a passenger compartment of a vehicle showing an instrument panel and a center console that includes a storage compartment assembly.
Figure 2:
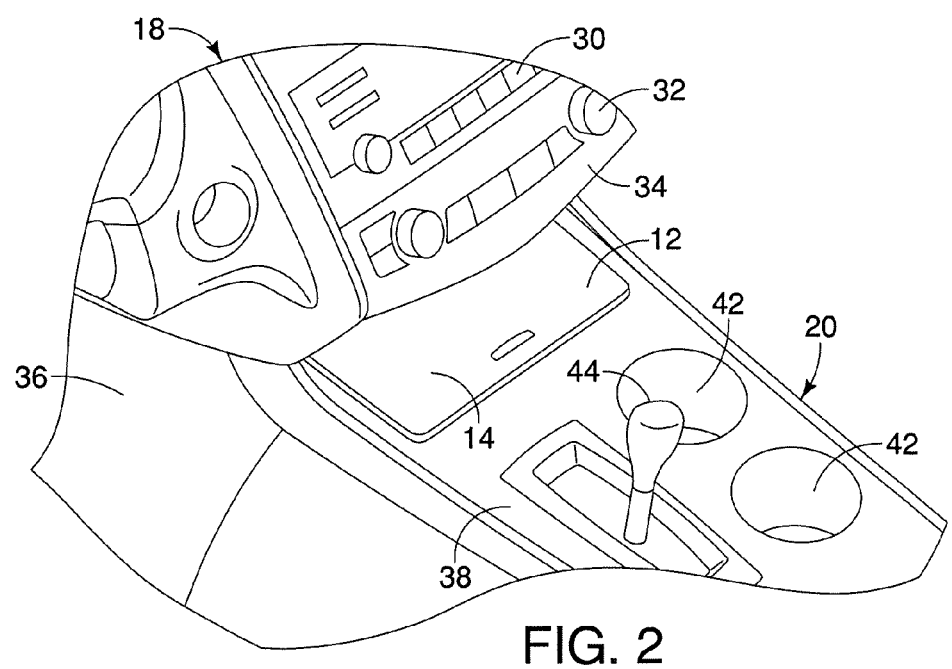
FIG. 2 is a perspective view of a portion of the center console and a portion of the instrument panel showing a lid of the storage compartment assembly.

Referring initially to FIG. 1, a passenger compartment 10 of a vehicle is illustrated in accordance with a first embodiment. The passenger compartment 10 includes a storage compartment assembly 12 with a lid 14 that is moveable between a closed position (FIGS. 1, 2 and 3) and an open position (FIG. 4). The storage compartment 12 includes a lid cavity (described in greater detail below) that partially conceals a portion of the lid 14 within the storage compartment assembly 12 when the lid 14 is in the open position. The lid 14 further includes features that prevent items stored within storage compartment assembly 12 from moving into the lid cavity when the lid 14 is in the open position, the closed position or an intermediate position between the open and closed positions. A more detailed description of the storage compartment assembly 12 is provided below.

A brief description of the passenger compartment 10 is now provided with reference to FIG. 1. The passenger compartment 10 is defined within a vehicle and includes, among other things, a floor 16, an instrument panel 18 (also referred to as a dashboard), a center console 20 and vehicle seats (not shown).

The instrument panel 18 is a conventional assembly that includes, for example, a steering column 22, a glove box 24, concealed air bags 26 and 28, an audio system control panel 30, and a climate control panel 32. The instrument panel 18 can include a variety of other conventional components, such as windshield wiper controls, light controls, etc. Description of such components is omitted for the sake of brevity.

The steering column 22 extends rearward from the instrument panel 18 into the passenger compartment 10. The glove box 24, the concealed air bags 26 and 28, the audio system control panel 30 and the climate control panel 32 are all supported within or housed by the instrument panel 18 in a conventional manner.

Figure 3:
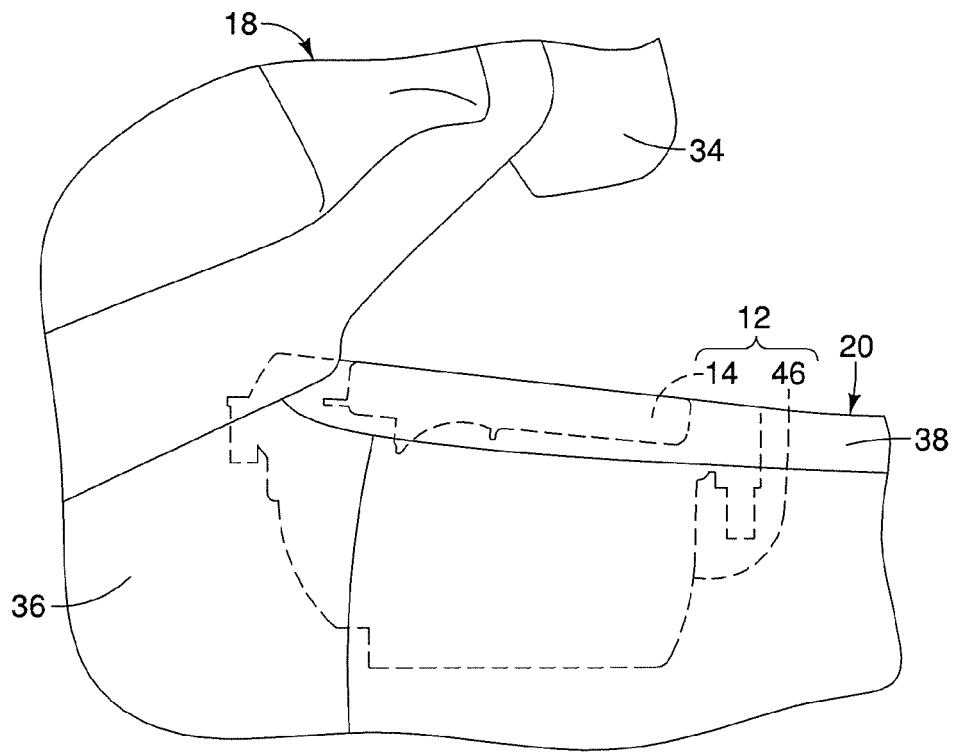
FIG. 3 is a side view of the center console and the instrument panel showing the lid in a closed position.
Figure 4:
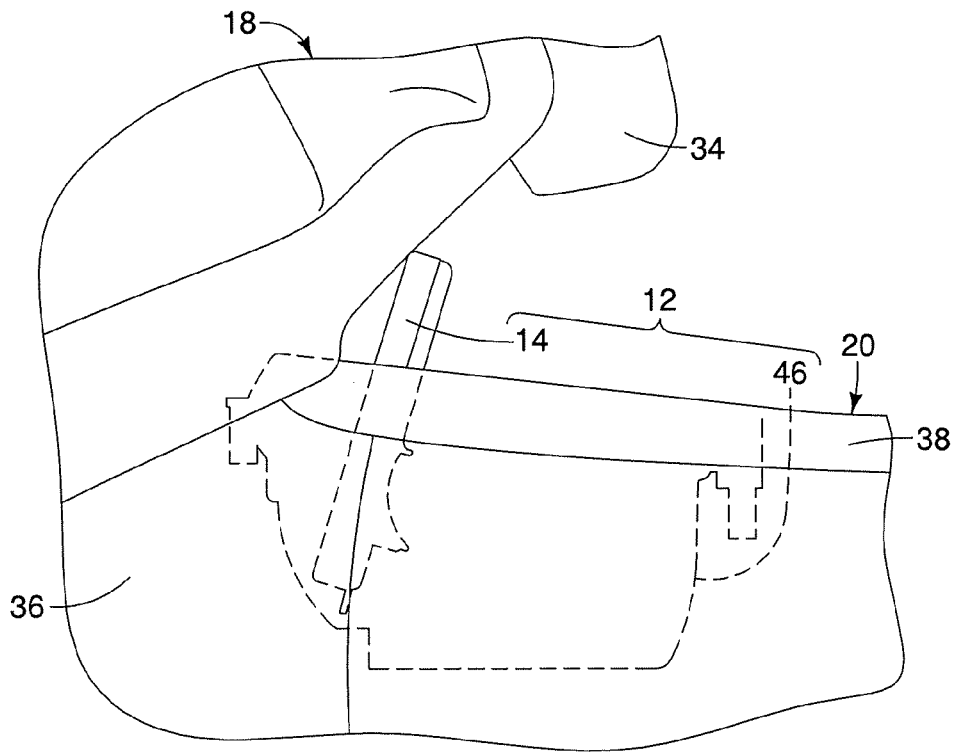
FIG. 4 is another side view of the center console and the instrument panel similar to FIG. 3, showing the lid in an open position.

The instrument panel 18 further includes a central overhang 34 that extends rearward within the passenger compartment 10, extending over the center console 20, as best shown in FIGS. 3 and 4. In the depicted embodiment the audio system control panel 30 and the climate control panel 32 are installed within the central overhang 34 of the instrument panel 18 above the center console 20.

It should be understood from the drawings and the description herein that the climate control panel 32 is operably connected to heating and cooling systems (not shown) within the vehicle for controlling heating and cooling of the passenger compartment 10. Since such heating and cooling systems are conventional vehicle features, further description is omitted for the sake of brevity.

It should also be understood from the drawings and the description herein that the audio system control panel 30 is operably connected to an audio system (not shown) within the vehicle. The audio system includes non-depicted features such as, for example, speakers, a radio, a CD player and an audio input, with some or all of those features being provided within the passenger compartment 10. One such audio input is described in greater detail below. More specifically, the audio system is configured to provide music and/or other audio features for the entertainment of passengers within the passenger compartment 10. Since such audio systems are conventional vehicle features, further description is omitted for the sake of brevity.

A brief description of the center console 20 is now provided with reference to FIGS. 1-4. The center console 20 is preferably installed to the floor 16 in a conventional manner by, for example, fasteners (not shown). The center console 20 is roughly or approximately divided into a forward end 36, a central section 38 and a rearward end 40, as best shown in FIG. 1. As best indicated in FIGS. 3 and 4, the majority of the storage compartment assembly 12 is disposed within the forward section 36 of the center console 20. The central section 38 includes cup holders 42 and a transmission shift control 44.

As best shown in FIGS. 3 and 4, the central overhang 34 of the instrument panel 18 extends rearward over the majority of the forward section 36 of the center console 20. More specifically, the central overhang 34 of the instrument panel 18 extends rearward over the majority of the storage compartment assembly 12. However, as is clear in FIG. 4, the central overhang 34 of the instrument panel 18 does not interfere with the opening and closing of the lid 14.

Figure 5:
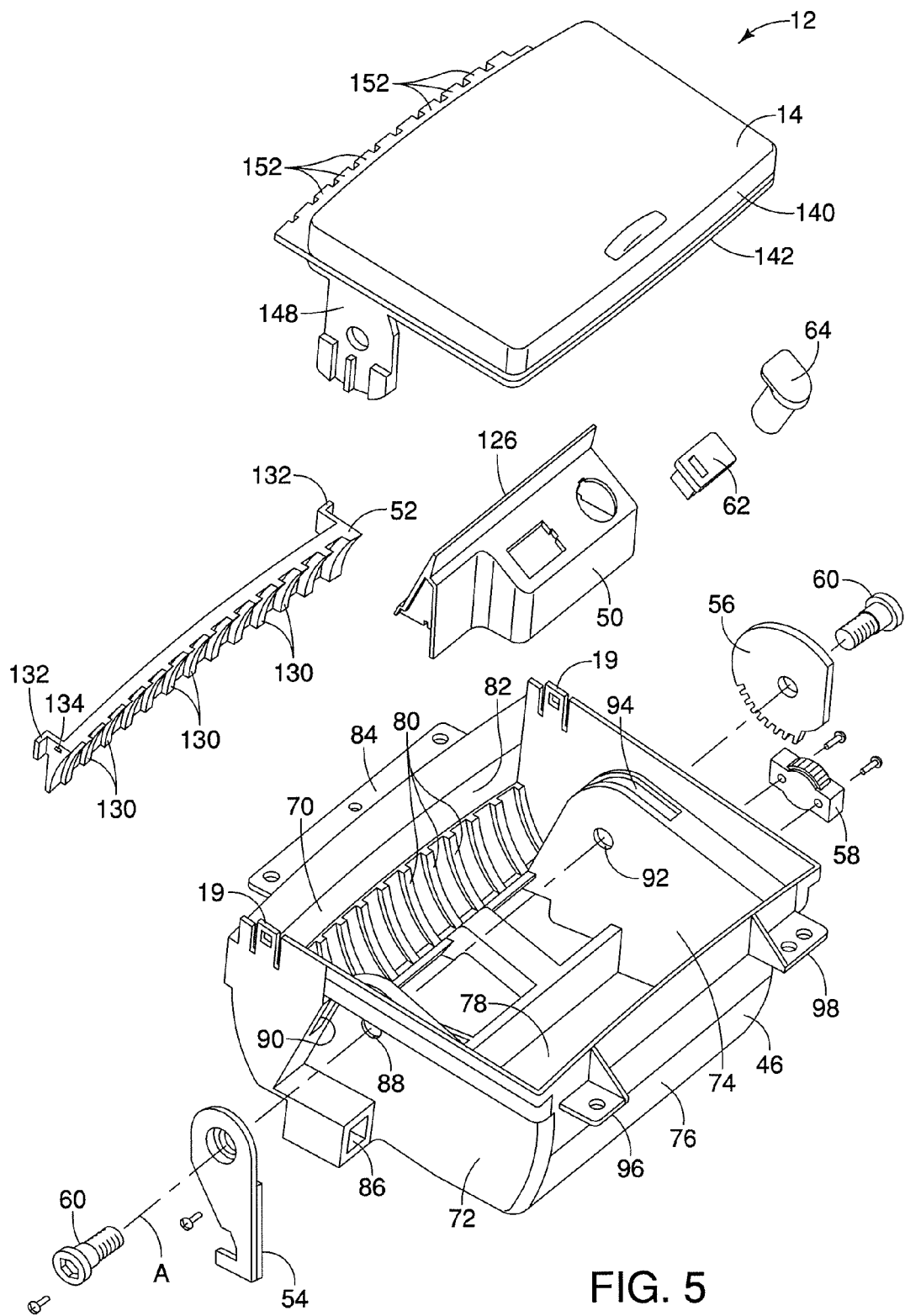
FIG. 5 is an exploded perspective view of the storage compartment assembly showing the lid, a housing, a lid cavity, a storage compartment, a partition wall, an insert and elements of a hinge assembly in accordance with the first embodiment.

A description of the storage compartment assembly 12 is now provided with initial reference to FIGS. 5-18. As best shown in FIG. 5, the storage compartment assembly 12 basically includes a housing 46, a partition wall 50, an insert 52, a latch member 54, a damping wheel 56, a damping device 58, hinge shafts 60, a first accessory interface 62 (e.g., a universal serial bus USB connector or other data communications interface), a second accessory interface 64 (e.g., an electrical socket or other power supply interface) and the lid 14.

Figure 6:
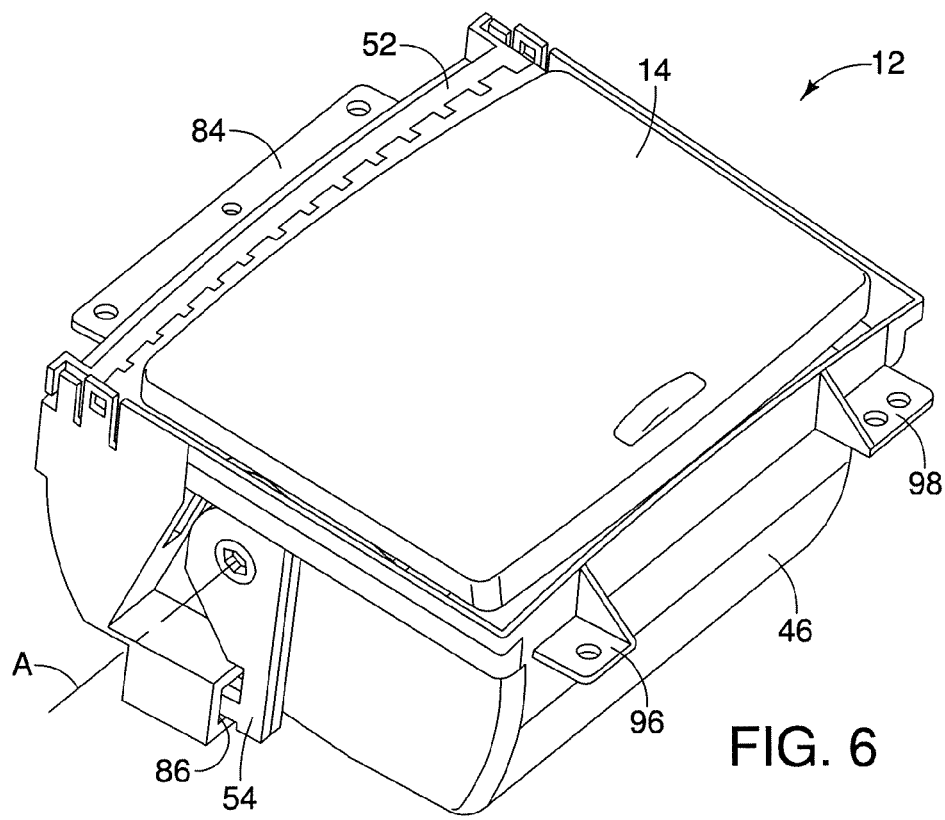
FIG. 6 is a perspective view of the storage compartment assembly removed from the center console, showing the lid and the housing of the storage compartment assembly with the lid in the closed position in accordance with a first embodiment.
Figure 7:
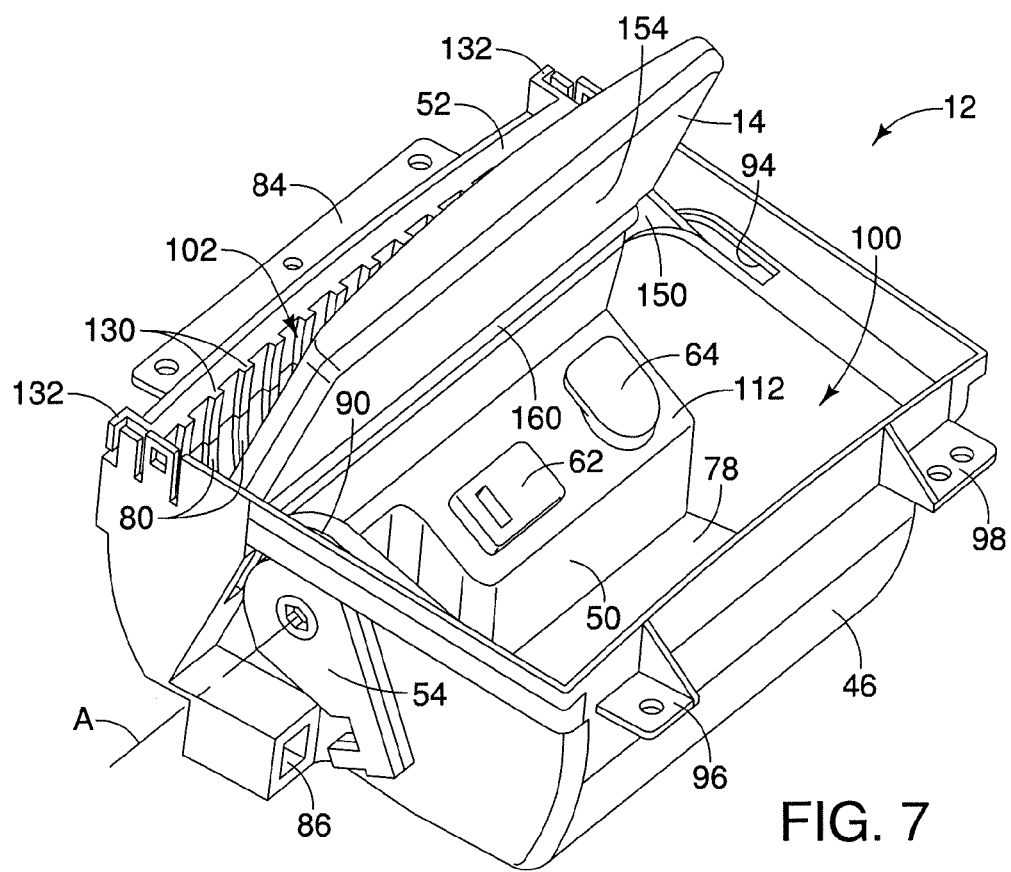
FIG. 7 is another perspective view of the storage compartment assembly removed from the center console, showing the lid in the open position revealing a lid cavity, the storage compartment and the partition wall separating the lid cavity from the storage compartment in accordance with the first embodiment.
Figure 8:
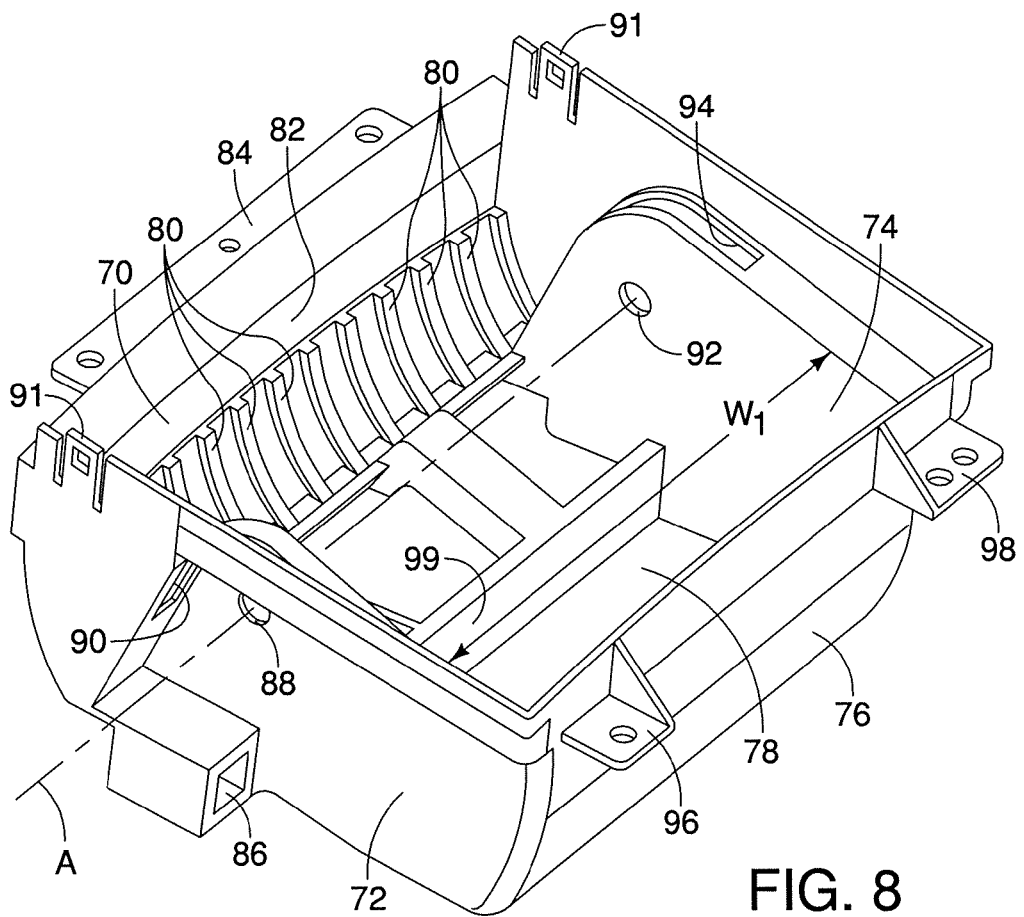
FIG. 8 is a perspective view of the housing showing features of the lid cavity and the storage compartment in accordance with the first embodiment.

With specific reference to FIGS. 5-8, a more detailed description of the housing 46 is now provided. The housing 46 is, for example, a molded plastic box-like structure with an open top, as shown in FIG. 8. The housing 46 can be made of any of a variety of materials, such as plastic, metal, metal alloys, polymers and/or composite materials. The housing 46 includes a rear wall 70, a first side wall 72, a second side wall 74, a front wall 76 and a bottom wall 78.

As best shown in FIG. 8, a portion of the rear wall 70 of the housing 46 includes a plurality of spaced apart arcuately shaped ribs 80, a vertical support wall 82 and an attachment flange 84. The ribs 80 arc about an axial center that coincides with an axis A. The axis A preferably extends in a horizontal direction relative to the vehicle. Consequently, the ribs 80 extend in at least partially in a vertical direction. As is described in greater detail below, the lid 14 pivots about the axis A. A further description of the ribs 80 is provided below along with a description of the insert 52 and the lid 14.

The vertical support wall 82 is dimensioned to provide support for the insert 52, as is described in greater detail below. The attachment flange 84 includes a plurality of fastener receiving apertures that are employed to attach the storage compartment assembly 12 to the center console 20 in a conventional manner.

The first side wall 72 includes a recess 86, an aperture 88, a slot 90 and a tab 91. The recess 86 retains a latch mechanism (not shown) that retains the lid 14 in the closed position, as described in greater detail below. The aperture 88 defines the axis A and is threaded to receive one of the hinge shafts 60 about which the lid 14 pivots. The slot 90 is dimensioned to receive a portion of the lid 14, as is described in greater detail below. The tab 91 is provided so that the insert 52 can snap-fit into the housing 46.

Similarly, the second side wall 74 includes another tab 91, an aperture 92 and a slot 94. The aperture 92 and the aperture 88 define the axis A. The aperture 92 is also dimensioned to receive one of the hinge shafts 60 about which the lid 14 pivots. Like the slot 90, the slot 94 is dimensioned to receive a portion of the lid 14, as is described in greater detail below.

An outer surface of the front wall 76 includes attachment flanges 96 and 98 with corresponding fastener receiving apertures that are employed to attach the storage compartment assembly 12 to the center console 20 in a conventional manner. The bottom wall 78 includes a flange section 99 that extends upward from the bottom wall 78 to provide support for the partition wall 50.

Figure 9:
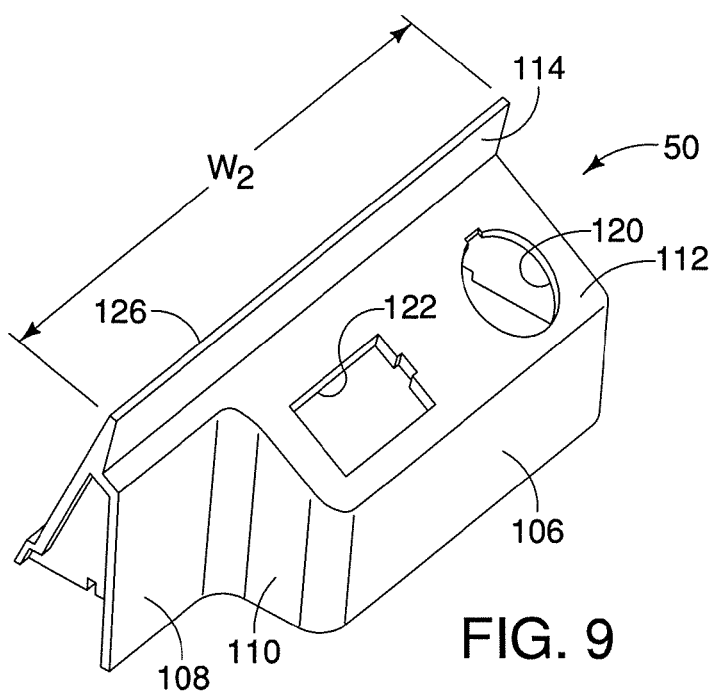
FIG. 9 is a perspective view of the partition wall shown removed from the housing in accordance with the first embodiment.

As best shown in FIGS. 5 and 9, the partition wall 50 is a separate member from the housing 46. It should be understood from the drawings and the description herein that the housing 46 and the partition wall 50 can be manufactured as a single monolithic element. However, in the depicted embodiment, the partition wall 50 and the housing 46 are separate elements. The partition wall 50 is dimensioned to snap fit in place within the housing 46 thereby dividing the housing 46 into two sections defining a storage compartment 100 and a lid cavity 102, as indicated in FIGS. 7, 17 and 18.

As is indicated in FIG. 8, the portion of the housing 46 that defines the storage compartment 100 together with the partition wall 50 has a width $W_1$. The width $W_1$ is defined between respective lower sections of the first side wall 72 and the second side wall 74. Upper sections of the first side wall 72 and the second side wall 74 have a wider dimension and include the slots 90 and 94. Further, as is clear in FIG. 8, the portion of the housing 46 that defines the lid cavity 102 with the partition wall 50 has a width greater than the width $W_1$.

Figure 10:
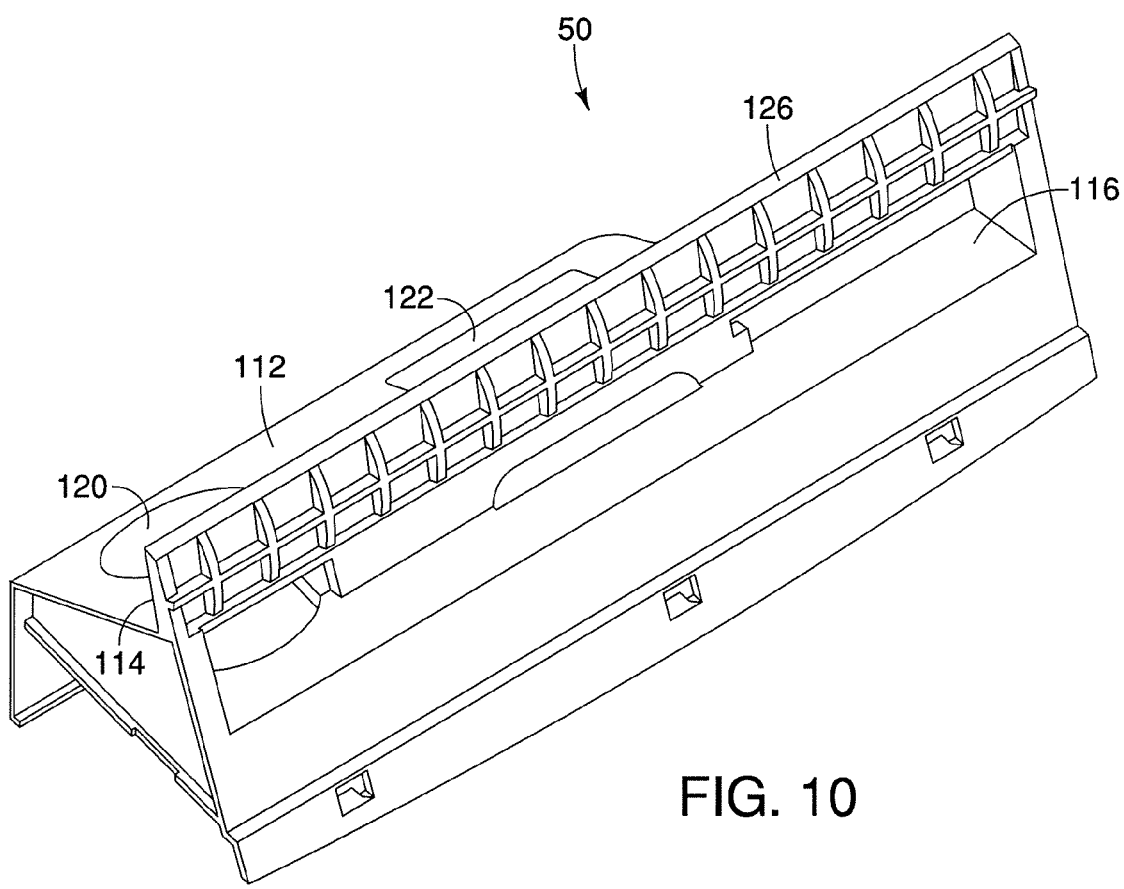
FIG. 10 is a reverse angle perspective view of the partition wall shown removed from the housing in accordance with the first embodiment.
Figure 17:
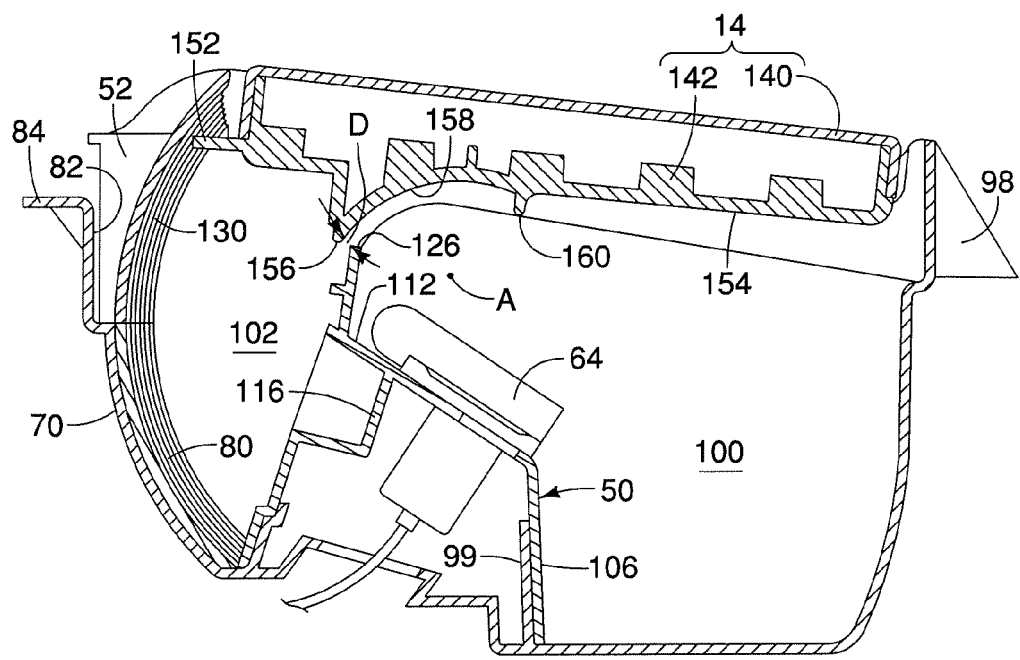
FIG. 17 is a side cross sectional view of the storage compartment assembly with the lid in the closed position in accordance with the first embodiment.
Figure 18:
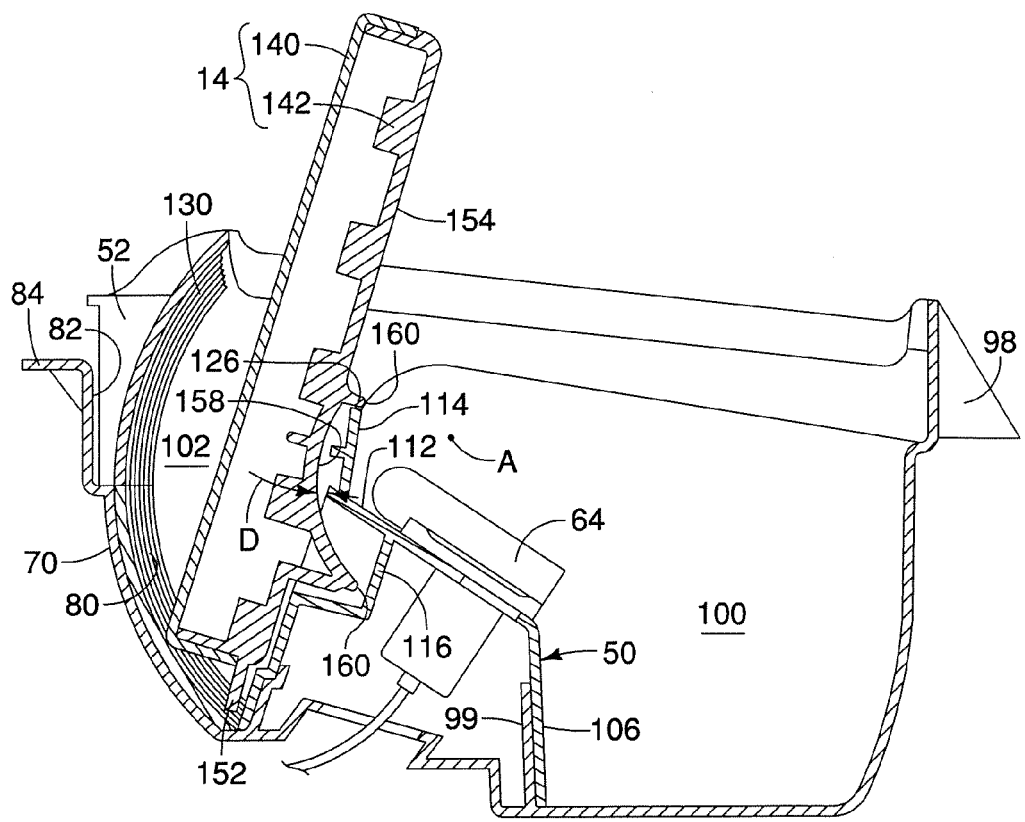
FIG. 18 is a side cross sectional view of the storage compartment assembly with the lid in the open position in accordance with the first embodiment.

As shown in FIGS. 9 and 10, the partition wall 50 includes a first lower wall section 106, a second lower wall section 108, an offset section 110, an accessory surface 112, a projection 114 and a channel 116 (see FIGS. 10, 17 and 18). The first lower wall section 106, the second lower wall section 108 and the offset section 110 are all vertical surfaces that extend upward from the bottom surface 78 of the housing 46 with the partition wall 50 installed within the housing 46. As shown in FIGS. 17 and 18, with the partition wall 50 installed in the housing 46, the first lower wall section 106 lies against the flange section 99.

As shown in FIG. 7, the accessory surface 112 of the partition wall 50 is located within the storage compartment 100 and is further spaced apart from and above the bottom wall 78 (a lower end) of the storage compartment 100 with the partition wall 50 installed within the housing 46. As shown in FIG. 9, the accessory surface 112 includes a first opening 120 and a second opening 122. The first opening 120 is dimensioned to receive the second accessory interface 64 and the second opening 122 is dimensioned to receive the first accessory interface 62, as best illustrated in FIG. 7. Hence, the accessory surface 112 includes the first accessory interface 62 and the second accessory interface 64.

As discussed above, the first accessory interface 62 can include a USP connector, which would typically be connected to the audio system controlled by the audio system control panel 30. The first accessory interface 62 can connect to an audio device such as an MP3 player or other audio producing device. The first accessory interface 62 can be configured to connect to other devices such as a CD player or a personal computer. Consequently as a result of being installed to the accessory surface 112, the first accessory interface 52 is located within the storage compartment 100 of the storage compartment assembly 12. Therefore, relatively small devices connected to the first accessory interface 62 can be placed within the storage compartment assembly 12 while in use and with the lid 14 in the open position. Similarly, such devices can also be conveniently concealed within the storage compartment 12 with the lid 14 in the closed position.

As discussed above, the second accessory interface 64 can be an electrical socket, which would typically be connected to the battery of the vehicle or to one or more electrical systems within the vehicle. In this case, the second accessory interface 64 can provide electrical current that powers accessories or other devices such as the above mentioned MP3 player, a telephone recharging adaptor, or other similar devices as desired by a passenger or driver in the passenger compartment 10. For example, the second accessory interface 64 can provide 12 volts of electrical potential, 110 volts of electrical potential or energy having other voltage characteristics. As with the first accessory interface 62, since the second accessory interface 64 is provided within the storage compartment 100 of the storage compartment assembly 12, any device connected to the second accessory interface 64 can be placed within the storage compartment assembly 12 while in use and with the lid 14 in the open position. Similarly, such a device can also be conveniently concealed within the storage compartment assembly 12 with the lid 14 in the closed position.

The projection 114 of the partition wall 50 has an upper free edge 126, as illustrated in FIGS. 5, 9, 17 and 18. The projection 114 extends upward from the accessory surface 112 with the upper free edge 126 being defined along the projection 114. A further description of the projection 114, the channel 116 and the upper free edge 126 is provided following the description below of the lid 14. As shown in FIG. 9, along the upper free edge 126, the projection 114 has a width $W_2$ that is approximately equal to the width $W_1$ of the storage compartment 100.

A description of the insert 52 is now provided with specific reference to FIG. 5. It should be understood from the drawings and the description herein that the housing 46 and the insert 52 can be manufactured as a single monolithic element. However, in the depicted embodiment, the insert 52 and the housing 46 are separate elements. The insert 52 is dimensioned to snap fit in place within the housing 46 and against the vertical support wall 82 of the rear wall 70 of the housing 46, as indicated in FIGS. 17 and 18.

Figure 13:
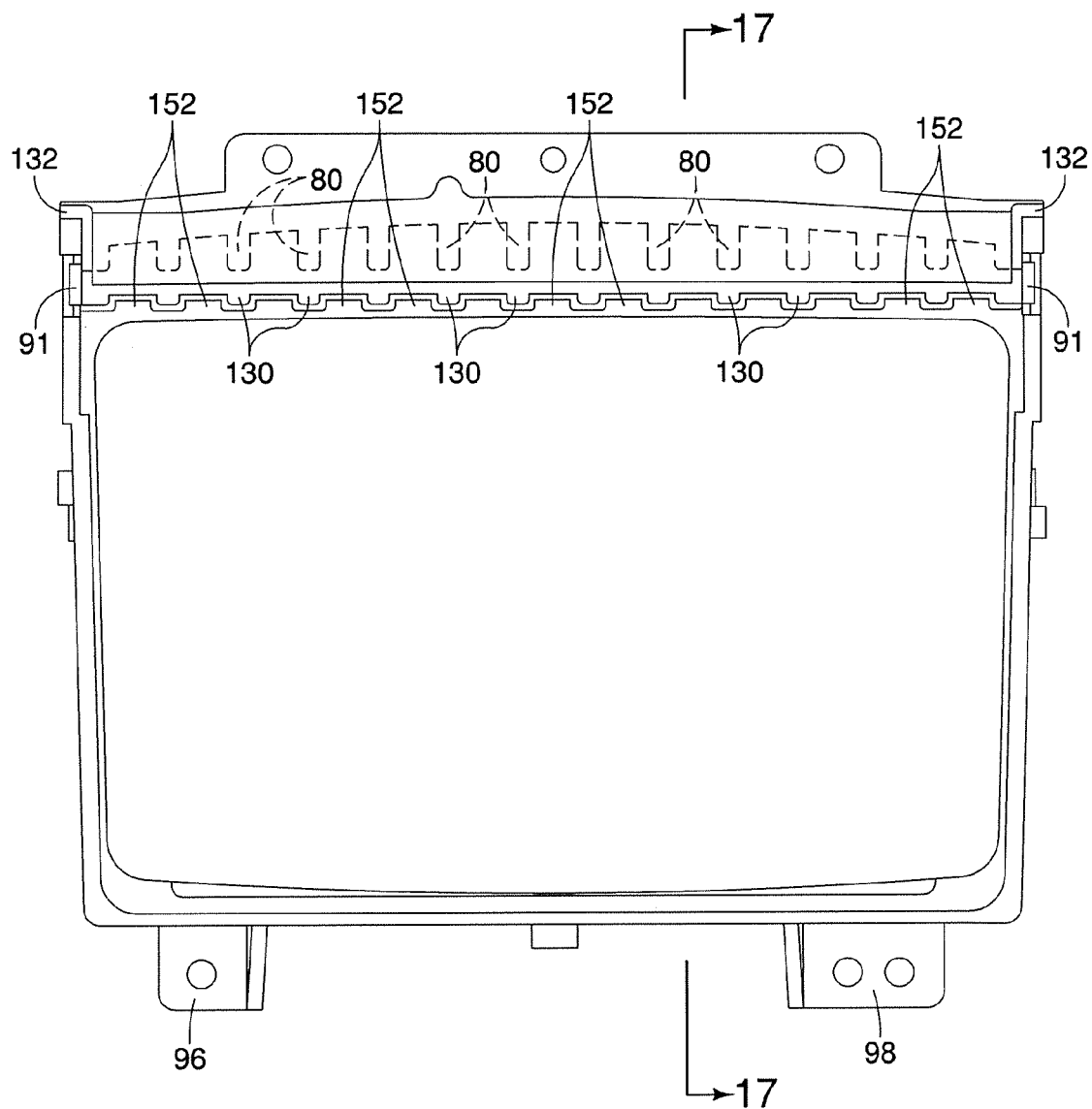
FIG. 13 is a top view of the storage compartment assembly removed from the center console, showing ribs of the lid cavity and ribs of the lid in accordance with the first embodiment.

The insert 52 includes a plurality of extension ribs 130, a pair of projections 132 and a pair of snap fitting projections 134. The plurality of extension ribs 130 are dimensioned and positioned to align with the plurality of ribs 80 of the rear wall 70 of the housing 46. FIG. 13 (a top view looking downward) shows upper ends of the plurality of ribs 80 in phantom and further shows the upper ends of the plurality of ribs 130. As shown in FIGS. 7 and 13, the lower ends of the plurality of ribs 130 align with the upper ends of the plurality of ribs 80. In other words, lower ends of the plurality of ribs 130 match the profile of upper ends of the plurality of ribs 80. Hence when installed in the housing 46, the plurality of ribs 80 and the plurality of ribs 130 form generally continuous first ribs that extend upward from a lower end of the lid cavity 102 to an upper end of the lid cavity 102, as indicated in FIGS. 17 and 18.

The latch member 54, the damping wheel 56, the damping device 58, and the hinge shafts 60 define elements of a hinge assembly for the lid 14, as is explained below after a description of the lid 14.

A description of the lid 14 is now provided with specific reference to FIGS. 5 and 11-16. The lid 14 basically includes an outer section 140 and an inner section 142. The outer section 140 is preferably cosmetically configured to match an outer surface of the center console 20. The outer section 140 and inner section 142 are fixedly attached to one another by fasteners (not shown), adhesives and/or by another fastening technique such as sonic welding. The outer section 140 and inner section 142 can also be snap-fitted to one another in a conventional manner.

The inner section 142 of the lid 14 includes a pair of hinge projections 148 and 150 (see FIGS. 11 and 14-16), a plurality of second ribs 152 (see FIGS. 11, 12, 17 and 18) and an inner surface 154 (see FIGS. 11, 12, 17 and 18). The hinge projections 148 and 150 extend from opposite side edges thereof, with the inner surface 154 extending therebetween.

Figure 14:
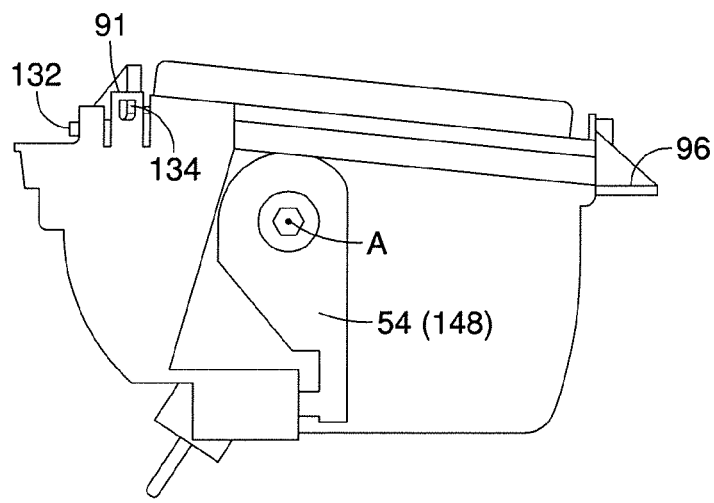
FIG. 14 is a first side view (e.g., a driver's side view or right hand side view) of the storage compartment assembly showing a latching mechanism in accordance with the first embodiment.
Figure 15:
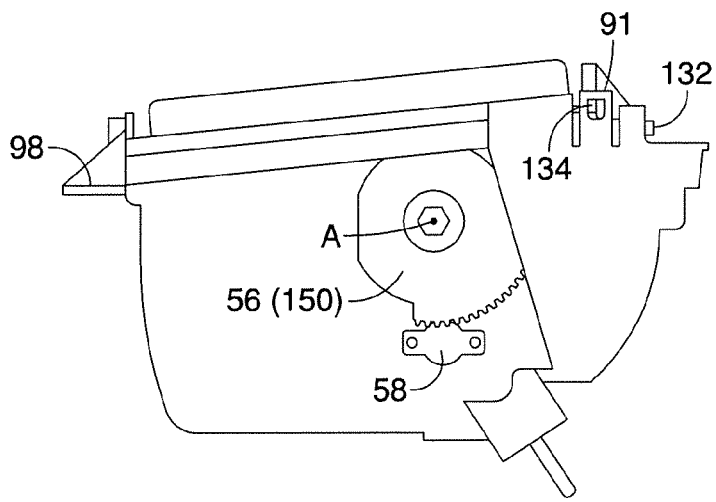
FIG. 15 is a second side view (e.g., a passenger's side view or left hand side view) of the storage compartment assembly opposite the first side view in FIG. 14 showing an opening mechanism in accordance with the first embodiment.
Figure 16:
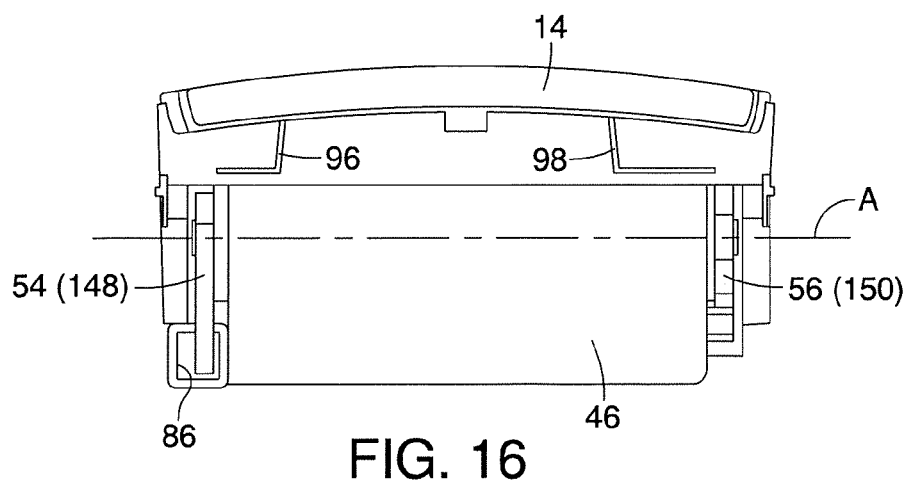
FIG. 16 is a rear view of the storage compartment assembly in accordance with the first embodiment.

When the lid 14 is installed to the housing 46, the hinge projection 148 is inserted into the slot 90 of the first side wall 72 of the housing 46. Hence, once installed to the housing 46, the hinge projection 148 extends along an exterior surface of the first side wall 72, as shown in FIGS. 14 and 16. The latch member 54 is then fixed to the hinge projection 148 with one of the hinge shafts 60 extending therethrough and into the aperture 88 of the housing 46. Similarly, when the lid 14 is installed to the housing 46, the hinge projection 150 is inserted into the slot 94 of the second side wall 74 of the housing 46. Hence, once installed to the housing 46, the hinge projection 150 extends along an exterior surface of the second side wall 74, as shown in FIGS. 15 and 16. The damping wheel 56 is then fixed to the hinge projection 150 with the other one of the hinge shafts 60 extending therethrough and into the aperture 92 of the housing 46. Thus, the lid 14 pivots about the hinge shafts 60 and the axis A.

With the storage compartment assembly 12 fully assembled, as shown in FIGS. 14-16, the lid 14 is pivotally secured to the housing 46 for movement about the axis A. As shown in FIGS. 6 and 14, the latch member 54 includes a projection that protrudes into the recess 86 with the lid 14 in the closed position. The recess 86 includes a latch mechanism that retains the lid 14 in the closed position by engagement with the projection of the latch member 54. As shown in FIGS. 15 and 16, the damping wheel 56 is secured to the hinge projection 150 of the lid 14. The damping wheel 56 engages gear teeth on the damping device 58. The damping device 58 is configured to bias the lid 14 for movement toward the open position and dampen movement of the lid 14 such that is opens with a predetermined rate of movement. Since the latch mechanism within the recess 86 and the damping device 58 are conventional mechanisms, further description is omitted for the sake of brevity.

The plurality of second ribs 152 are formed along one end or edge of the inner section 142 of the lid 14. With the lid 14 installed, the second ribs 152 extend into spaces between corresponding ones of the first ribs (the ribs 80 of the housing 46 and the ribs 130 of the insert 52). The plurality of second ribs 152 of the lid 14 are dimensioned to extend between adjacent ones the first ribs 80 and 130, such that the second ribs 152 move along the respective spaces defined between the first ribs 80 and 130 as the lid 14 moves between the open position and the closed position.

In other words, since the ribs 80 and 130 have an arcuate shape centered about the axis A, the second ribs 152 sweep between the first ribs (the ribs 80 and 130) as the lid 14 is moved. One of the benefits of the relationship between the first ribs (the ribs 80 and 130) and the second ribs 152 is that any item or items located on the lid 14 and possibly concealed under the central overhang 34 of the instrument panel 18 are captured by the second ribs 152 and prevented from remaining within the lid cavity 102. For example, with the lid 14 in the open position, if a pen or pencil falls into an exposed section of the lid cavity 102 (for example at a left most side in FIG. 18) with the lid 14 in the open position, the ribs 80 and 130 along with the second ribs 152 will prevent the pen or pencil from falling down below the second ribs 152. As the lid 14 is moved to the closed position, the second ribs 152 push the pen or pencil upward and out of the lid cavity 102. Thus, it is difficult, if not impossible, for items to become trapped or lodged within the lid cavity 102.

The inner surface 154 of inner section 142 of the lid 14 covers the storage compartment 100 and the lid cavity 102 with the lid 14 in the closed position, as indicated in FIG. 17. The inner surface 154 of inner section 142 of the lid 14 extends between the pair of hinge projections 148 and 150. The inner surface 154 includes a first blocking portion 156, a second blocking portion 158 and a third blocking portion 160.

Figure 11:
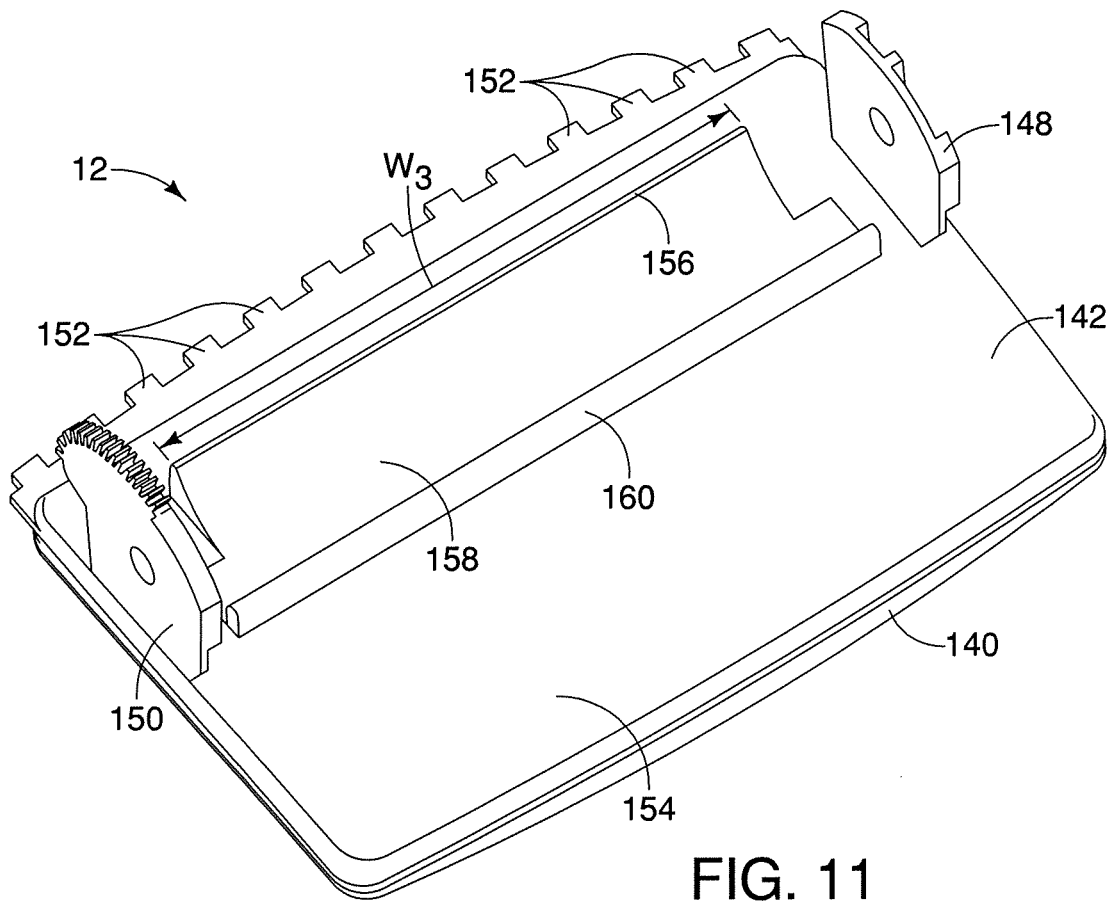
FIG. 11 is a perspective view of the lid showing an inner surface with a first blocking portion, a second blocking portion and a third blocking portion in accordance with the first embodiment.
Figure 12:
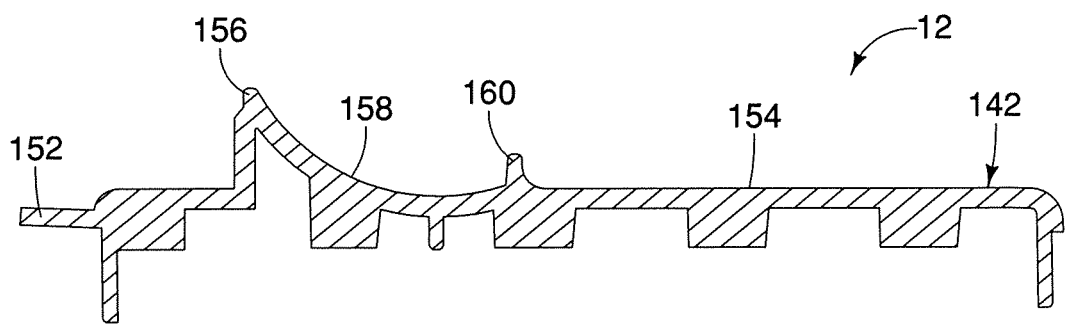
FIG. 12 is a side cross-sectional view of an inner section of the lid showing details of the first, second and third blocking portions in accordance with the first embodiment.

The first blocking portion 156 is basically an elongated projection that includes a projecting surface that extends downward from the lid 14 with the lid 14 in the closed position. The first blocking portion 156 extends laterally across in a direction parallel to the axis A. FIG. 11 shows the lid 14 turned upside down and FIG. 12 shows only a cross-section if the inner section 142 to highlight the profile of the first blocking portion 156, the second blocking portion 158 and the third blocking portion 160. As indicated in FIG. 11, the first blocking portion 156 has an overall width $W_3$ that is approximately 1% to 5% less than the width $W_1$ so that the lid 14 can move freely between the closed position and the open position. As indicated in FIG. 18, the channel 116 is dimensioned such that the first blocking portion 156 is received within the channel 116 with the lid 14 in the open position.

As indicated in FIG. 12, the first blocking portion 156 and the third blocking portion 160 extend perpendicularly from the inner surface 154. However, the first blocking portion 156 extends away from the inner surface 154 by a much greater distance than the third blocking portion 160, as shown in FIG. 12. Similarly to the first blocking portion 156, the third blocking portion 160 also extends laterally across the lid 14 in a direction parallel to the axis A.

Figure 19:
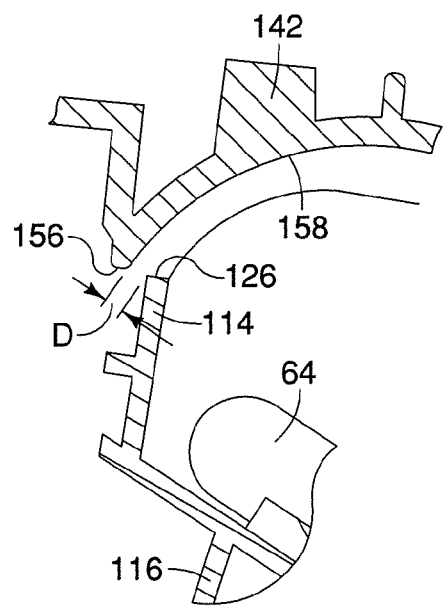
FIG. 19 is a side cross sectional view of an enlarged portion of the compartment assembly, showing a distance between first and second blocking portions of the lid and an upper free edge of the partition wall with the lid in the closed position in accordance with the first embodiment.

The second blocking portion 158 is basically a curved surface that extends between the first blocking portion 156 and the third blocking portion 160. More specifically, the second blocking portion 158 defines a curved slope between the first blocking portion 156 and the third blocking portion 160. The second blocking portion 158 also has an overall width equal to the width $W_3$. The arcuate or curved surface of the second blocking portion 158 arcs about the axis A. Consequently, as the lid 14 moves between the closed position (FIGS. 17 and 19) and the open position (FIG. 18), the second blocking portion 158 moves past the upper free edge 126 of the projection 114 maintaining an approximately constant distance D away from the upper free edge 126. Further, even in an intermediate position shown in FIG. 20 mid-way between the open position and the closed position, the second blocking portion 158 is approximately the distance D away from the upper free edge 126 of the projection 114.

The third blocking portion 160 is basically a ridge or projection that extends between the hinge projections 148 and 150. As shown in FIG. 18, when the lid 14 is in the open position, the third blocking portion 160 interferes with movement of the lid 14 relative to the projection 114. More specifically, the third blocking portion 160 is dimensioned to contact or overlap the upper free edge 126 of the projection 114 to prevent further opening movement of the lid 14 and also prevent the contents of the storage compartment 100 from entering the lid cavity 102 while the lid 14 is in the open position.

Thus, the first blocking portion 156 of the inner surface 154 is configured relative to the upper free edge 126 of the partition wall 50 such that with the first blocking portion 156 is disposed adjacent the upper free edge 126 of the partition wall 50, in the closed position, the first blocking portion 156 blocks space above the upper free edge 126 of the partition wall 50 while the lid 14 is in the closed position, as shown in FIG. 17.

Figure 20:
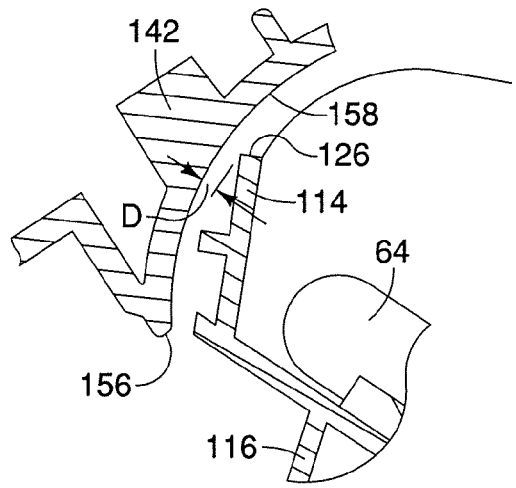
FIG. 20 is another side cross sectional view of an enlarged portion of the compartment assembly similar to FIG. 19, showing a distance between the second blocking portion of the lid and the upper end of the partition wall with the lid in an intermediate position mid-way between the open position and the closed position in accordance with the first embodiment.

The second blocking portion 158 extends between the projecting surface of the first blocking portion 156 and the third blocking portion 160. The second blocking portion 158 blocks the space above the upper free edge 126 of the partition wall 50 while the lid 14 is moving between the open position and the closed position. In other words, the second blocking portion 158 (which includes a curved surface) passes alongside the upper free edge 126 of the partition wall 50 while the lid 14 is moving between the open position and the closed position, as shown in FIG. 20.

Further, the third blocking portion 160 of inner surface 154 of the lid 14 is spaced apart from the first blocking portion 156. The third blocking portion 160 aligns with or overlaps the upper free edge 126 of the partition wall 50 to block the space above the upper free edge 126 of the partition wall 50 while the lid 14 is in the open position, as shown in FIG. 18. The third blocking portion 160 is spaced apart from the upper free edge 126 of the partition wall 50 while the lid 14 is in the closed position, as shown in FIG. 17.

As mentioned above with respect to FIGS. 3 and 4, the central overhang 34 extends rearward over the lid 14. The inclusion of the lid cavity 102 and the position of the axis A is such that the lid 14 is hinged to the housing 46 in a manner that prevents interference between the lid 14 and the central overhang 34 of the instrument panel 18 while the lid 14 is moving between the open position and the closed position. The prevention of interference is at least partially due to the lid 14 pivoting about the axis A. Specifically, the axis A extends through the housing 46 at a location below the upper free edge 126 of partition wall 50, as indicated in FIGS. 17 and 18.

The position of the axis A and orientation of the lid 14 makes it possible for the lid 14 to be pivotally mounted to the housing 46 for movement between the open position and the closed position such that at least a portion of the lid 14 is positioned within the lid cavity 102 with the lid 14 in the open position. With the lid 14 in the open position, the storage compartment 100 is completely uncovered.

Second Embodiment

Figure 21:
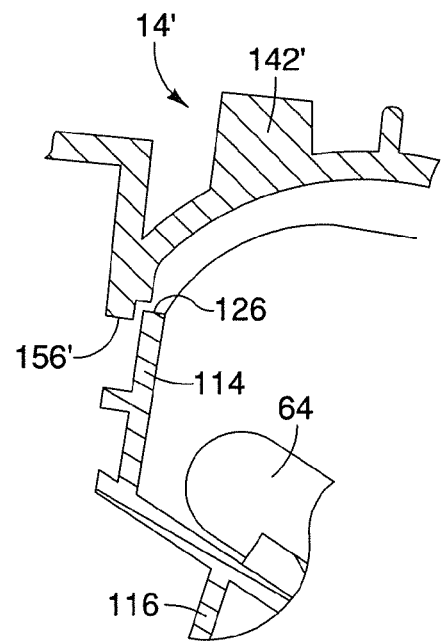
FIG. 21 is another side cross sectional view of an enlarged portion of the compartment assembly similar to FIG. 19, showing a modified first blocking portion of a lid with the lid in the closed position in accordance with a second embodiment.

Referring now to FIG. 21, a lid 14' in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (').

In the second embodiment, the lid 14' has been modified such that the inner section 142 of the first embodiment has been replaced with an inner section 142'. Otherwise, all features of the lid 14' remain unchanged and are identical to the lid 14 of the first embodiment. The inner section 142' includes a first blocking portion 156' that includes a shoulder that overlaps with the projection 114 in both a vertical direction and a horizontal direction with the lid 14' in the closed position, as shown in FIG. 20. Although not shown in FIG. 20, the inner section 142' includes all other features of the inner section 142 of the first embodiment, such as the ribs 152, and the second and third blocking portions 158 and 160, respectively.

Third Embodiment

Figure 22:
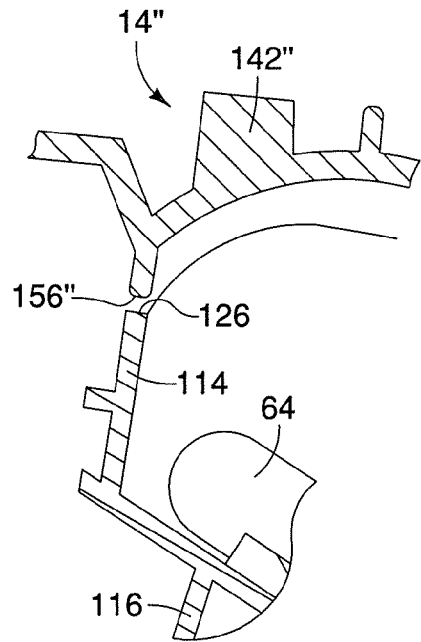
FIG. 22 is another side cross sectional view of an enlarged portion of the compartment assembly similar to FIG. 21, showing a modified first blocking portion of a lid with the lid in the closed position in accordance with a third embodiment.

Referring now to FIG. 22, a lid 14" in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity. The parts of the third embodiment that differ from the parts of the first embodiment will be indicated with a double prime (").

In the third embodiment, the lid 14" has been modified such that the inner section 142 of the first embodiment has been replaced with an inner section 142". Otherwise, all features of the lid 14" remain unchanged and identical to the lid 14 of the first embodiment. The inner section 142" includes a first blocking portion 156" that aligns vertically with the projection 114 with the lid 14" in the closed position, as shown in FIG. 22. Although not shown in FIG. 22, the inner section 142" includes all other features of the inner section 142 of the first embodiment such as the ribs 152, and the second and third blocking portions 158 and 160, respectively.

Fourth Embodiment

Figure 23:
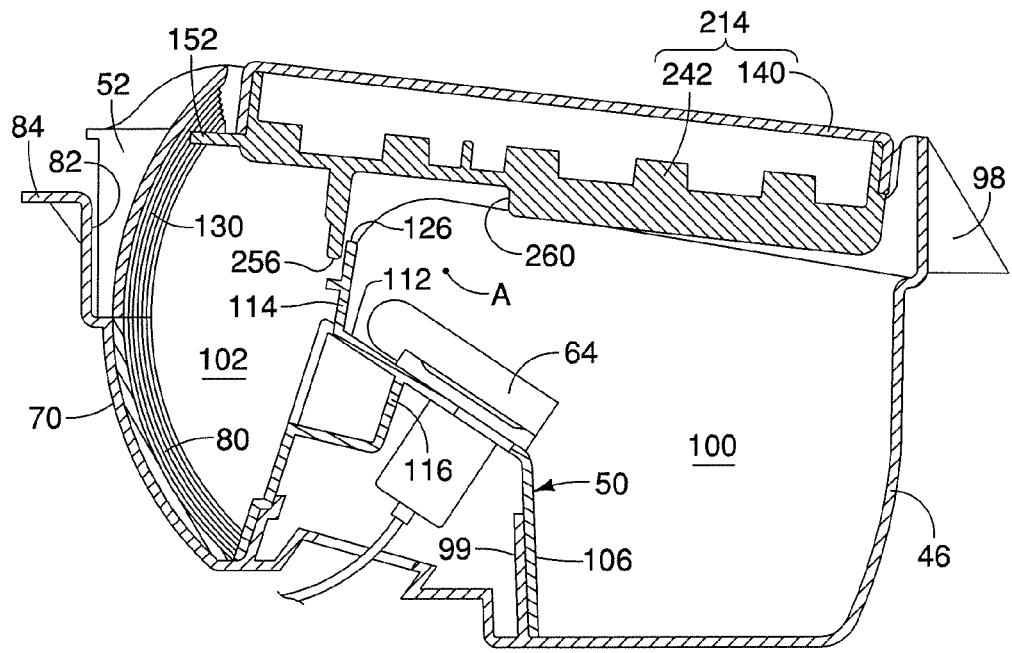
FIG. 23 is a side cross sectional view of a storage compartment assembly with a lid in a closed position in accordance with a fourth embodiment.
Figure 24:
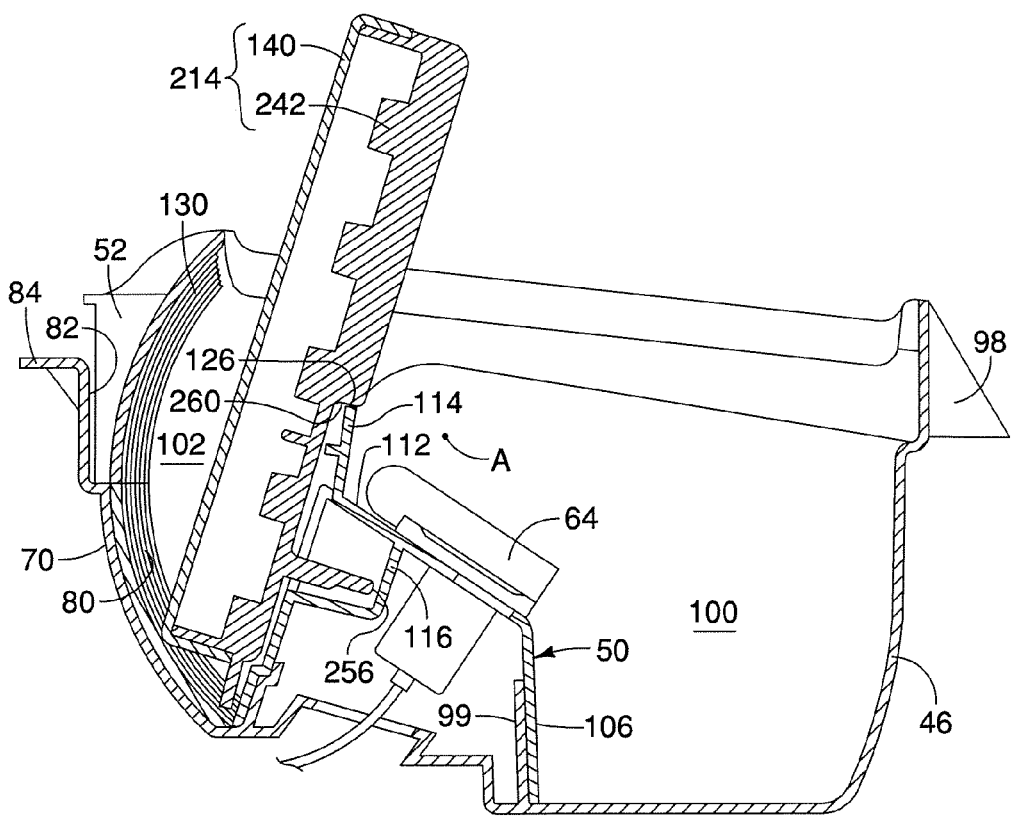
FIG. 24 is a side cross sectional view of the storage compartment assembly with the lid in an open position in accordance with the fourth embodiment.

Referring now to FIGS. 23 and 24, a lid 214 in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

In the fourth embodiment, the lid 214 has been modified such that the inner section 142 of the first embodiment has been replaced with an inner section 242. Otherwise, all features of the lid 214 remain unchanged and identical to the lid 14 of the first embodiment. In the fourth embodiment, the inner section 242 includes only a first blocking section 256 and a third blocking section 260. However, the inner section 242 could also be formed to include a curved surface that extends between the first and third blocking sections 256 and 260, respectively, as with the second blocking section 158 of the first embodiment. The first blocking section 256 extends from the inner surface of the inner section 242 in a manner similar to the first blocking section 156 of the first embodiment. The third blocking section 260 is formed by a recess or edge formed on the inner surface of the inner section 242 at a location similar to the location of the third blocking section 160 of the first embodiment.

The first blocking section 256 and the third blocking section 260 serve the same purpose as the first blocking section 156 and the third blocking section 160 of the first embodiment. However, in the fourth embodiment, the inner surface of the inner section 242 has been extended from the third blocking section 260 to a rear end of the lid 14. This arrangement makes for simpler manufacturing but provides generally the same functions and benefits of the configuration of the inner section 142 of the first embodiment. Specifically, the first blocking section 256 prevents the contents of the storage compartment 100 from entering the lid cavity 102 with the lid 214 in the closed position, as shown in FIG. 23. The second blocking section 260 prevents the contents of the storage compartment 100 from entering the lid cavity 102 with the lid 214 in the open position, as shown in FIG. 24. Additionally, the inner section 142 is substantially flush with the projection 114 of the partition wall 50 from the second blocking projection 260 to the rear end of the lid 14 with the lid 14 in the open position, which results in an alternative aesthetic appearance.

The various components within the passenger compartment 10, such as elements of the instrument panel 18 and elements of the center console 20 other than the storage compartment assembly 12, are conventional components that are well known in the art. Since these various components are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle and passenger compartment equipped with the storage compartment assembly 12. Accordingly, these terms, as utilized to describe the present invention should be interpreted relative to a vehicle equipped with the storage compartment assembly 12.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle storage compartment assembly comprising:
a housing defining a storage compartment and a lid cavity that are separated by a partition wall having an upper free edge; and
a rigid lid pivotally mounted to the housing for movement between an open position and a closed position, at least a portion of the lid being positioned within the lid cavity and the storage compartment being uncovered while the lid is in the open position, the lid covering the storage compartment and at least a portion of the lid cavity while the lid is in the closed position, and the lid having an inner surface that is configured relative to the upper free edge of the partition wall such that a first blocking portion of the inner surface is disposed adjacent the upper free edge of the partition wall to block a space above the upper free edge of the partition wall while the lid is in the closed position.

2. The vehicle storage compartment assembly according to claim 1, wherein
the inner surface of the lid includes a second blocking portion spaced apart from the first blocking portion, the second blocking portion being located adjacent to the partition wall to block the space above the upper free edge of the partition wall while the lid is in the open position, the second blocking portion being spaced apart from the upper free edge of the partition wall while the lid is in the closed position.

3. The vehicle storage compartment assembly according to claim 2, wherein
the second blocking portion includes a generally planar surface that extends in a direction away from the first blocking portion, the planar surface covering at least a portion of the storage compartment with the lid in the closed position, and
the first blocking portion includes a projecting surface that extends in a direction perpendicular to the planar surface toward the upper free edge of the partition wall with the lid in the closed position.

4. The vehicle storage compartment assembly according to claim 2, wherein
the inner surface of the lid includes a third blocking portion that extends between the first blocking portion and the second blocking portion, the third blocking portion blocking the space above the upper free edge of the partition wall while the lid is moving between the open position and the closed position.

5. The vehicle storage compartment assembly according to claim 2, wherein
the second blocking portion includes a projecting surface that extends in a direction parallel to the planar surface such that the projecting surface at least partially overhangs the free edge of the partition wall with the lid in the open position.

6. The vehicle storage compartment assembly according to claim 1, wherein
the lid includes a first end and a second end opposite the first end, the first end being disposed within the lid cavity and the second end extending upward and away from the housing with the lid in the open position.

7. The vehicle storage compartment assembly according to claim 6, wherein
the housing includes an inner surface that at least partially defines the lid cavity, the inner surface of the lid cavity including a plurality of first ribs extending therefrom, the first ribs extending from a lower end of the lid cavity to an upper end of the lid cavity, and
the first end of the lid includes a plurality of second ribs dimensioned to extend between adjacent ones the first ribs such that the second ribs move along respective spaces formed between the first ribs as the lid moves between the open position and the closed position.

8. The vehicle storage compartment assembly according to claim 1, wherein
the housing is mounted within a center console of a vehicle with the lid being exposed through an opening of the center console.

9. The vehicle storage compartment assembly according to claim 1, wherein
the partition wall includes an accessory surface located within the storage compartment spaced apart from and above a lower end of the storage compartment.

10. The vehicle storage compartment assembly according to claim 9, wherein
the partition wall includes a projection that extends upward from the accessory surface, the upper free edge being defined along the projection.

11. The vehicle storage compartment assembly according to claim 9, wherein
the accessory surface includes an accessory interface.

12. The vehicle storage compartment assembly according to claim 9, wherein
the lid pivots about a pivot axis that extends through the housing at a location below the accessory surface of the partition wall.

13. The vehicle storage compartment assembly according to claim 1, wherein
the lid pivots about a pivot axis that extends through the housing at a location below the upper free edge of partition wall.

14. The vehicle storage compartment assembly according to claim 1, wherein
the partition wall defines a channel that extends laterally along the partition wall and that opens into the lid cavity of the housing, the first blocking portion being received within the channel when the lid is in the open position.

15. The vehicle storage compartment assembly according to claim 1, wherein
the first blocking portion of the inner surface aligns with or overlaps with the upper free edge of the partition wall with the lid in the closed position.

16. An interior structural assembly for a vehicle comprising:
a center console mounted within a passenger compartment of the vehicle, the center console defining an opening;
an instrument panel mounted within the passenger compartment, the instrument panel including a cantilevered portion that overhangs at least a majority of the opening; and
a storage compartment mounted within the center console such that the storage compartment is exposed through the opening, the storage compartment including,
a housing defining a storage cavity and a lid cavity that are separated by a partition wall having an upper free edge, and
a rigid lid pivotally mounted to the housing for movement between an open position and a closed position, at least a portion of the lid being positioned within the lid cavity and the storage compartment being uncovered while the lid is in the open position, the lid covering the storage compartment and at least a portion of the lid cavity while the lid is in the closed position, and the lid having an inner surface that is configured relative to the upper free edge of the partition wall to substantially block a space above the upper free edge of the partition wall when the lid is in the closed position.

17. The interior structural assembly according to claim 16, wherein
the lid includes a first end and a second end opposite the first end, a minimum clearance between the cantilevered portion of the instrument panel and the console being less than a distance from the first end of the lid to the second end of the lid.

18. The interior structural assembly according to claim 16, wherein
the lid has an inner surface that is configured relative to the upper free edge of the partition wall such that a first blocking portion of the inner surface is disposed adjacent the upper free edge of the partition wall and aligns with the partition wall to substantially block a space above the upper free edge of the partition wall while the lid is in the closed position.

19. The interior structural assembly according to claim 18, wherein
the inner surface of the lid includes a second blocking portion spaced apart from the first blocking portion, the second blocking portion aligning with the upper free edge of the partition wall to block the space above the upper free edge of the partition wall while the lid is in the open position, the second blocking portion being spaced apart from the upper free edge of the partition wall while the lid is in the closed position.

20. The interior structural assembly according to claim 18, wherein
the partition wall defines a channel that extends laterally along the partition wall and that opens into the lid cavity of the housing, the first blocking portion being received within the channel when the lid is in the open position.

* * * * *